United States Patent [19]
Lalande

[11] Patent Number: 5,721,178
[45] Date of Patent: Feb. 24, 1998

[54] METHOD OF AND MEANS FOR PRODUCING A LABEL ASSEMBLY HAVING ADHESIVE ON THE BASE SHEET ONLY

[75] Inventor: Jean Claude Lalande, Colchester, Vt.

[73] Assignee: KoBel, Inc., Milton, Vt.

[21] Appl. No.: 629,140

[22] Filed: Apr. 8, 1996

[51] Int. Cl.⁶ ........................ B32B 9/00
[52] U.S. Cl. ........... 442/59; 428/40.1; 428/42.2; 428/43; 428/194; 428/195; 428/214; 428/243; 428/342; 428/352; 428/914; 156/243; 156/244.16; 156/252
[58] Field of Search ................. 428/262, 243, 428/236, 43, 202, 195, 914, 352, 42.2, 194, 214, 207, 342, 40.1, 41.4; 156/250, 243, 244.16; 283/81

[56] References Cited

U.S. PATENT DOCUMENTS

| | | | |
|---|---|---|---|
| 4,056,661 | 11/1977 | Sato et al. | 428/144 |
| 5,019,436 | 5/1991 | Schramer | 428/40 |
| 5,154,956 | 10/1992 | Fradrich | 428/40 |
| 5,284,689 | 2/1994 | Laurash et al. | 428/40 |
| 5,413,532 | 5/1995 | Raby | 462/2 |
| 5,518,787 | 5/1996 | Konkol | 428/43 |

*Primary Examiner*—Patrick Ryan
*Assistant Examiner*—Abraham Bahta
*Attorney, Agent, or Firm*—Thomas N. Neiman

[57] ABSTRACT

The label assembly having adhesive on base sheet only is designed to provide a label for use on clothing or fabric material which has no adhesive on the label itself. The front portion of the label has a printed message. The back portion has a silicon coating and can have an additional printed message. The base sheet to which the label or labels are attached thereto has adhesive applied to retain the labels in place for printing and shipping. When the label is removed from the base sheet, there is no adhesive remaining on the label itself. The method of producing the label assembly is also disclosed. The steps include: providing a plurality of webs of sheet material; printing, as necessary, on one of said on sheets of material; coating the back of said printed sheet with silicone; positioning an adhesive pattern on the other sheet of material; laminating the sheets together; die cutting and stripping the matrix creating the tag; initial cutting the sheets into strips, if necessary; and, punching the form feeding apertures into the edges of the sheets.

4 Claims, 2 Drawing Sheets

METHOD OF AND MEANS FOR PRODUCING A LABEL ASSEMBLY HAVING ADHESIVE ON THE BASE SHEET ONLY

BACKGROUND OF THE INVENTION

The present invention is directed to a tag. More particularly, the present invention is directed to method of and means for producing a label assembly having adhesive on the base sheet only.

Tags that are used with clothing or fabric material products are well known in the field. There are problems with the use of high speed printing machines when the tag has a dry release coating adhesive on it. Also, it is often necessary to print on both sides of the tag, which is impossible with standard methods.

It is the object of this invention to describe a label assembly which has no adhesive on the tag itself and will not have an adhesive residue on the tag or the clothing or fabric material. Also use of the patterned adhesive on the base or carrier sheet allows the tag to be printed on a non impact or impact printer without adhesive ooze contamination or pre-dispensing commonly associated with standard products.

Printing on top of a sheet of material with standard dry release coating adhesive on the back of the sheet can cause a number processing difficulties with the print run that can be overcome by the use of a label assembly with no adhesive on the back of the label itself.

Accordingly, there is a need to provide a label assembly having adhesive on the base sheet only which overcomes the above identified deficiencies.

SUMMARY OF THE INVENTION

Particularly, it is the object of this invention to teach a label assembly having adhesive on the base sheet only, for use in applications that are required for consumer product and allows the use of impact and non impact printing equipment, comprising a base sheet of material; said base sheet of material having a front side and a rear side; said front side of said base sheet of material having patches of adhesive material positioned thereon for attaching purposes; a second sheet of material; said second sheet of material having a top side and a bottom side; said top side of said second sheet of material having printable areas located thereon; said bottom side of said second sheet of material having a silicone coating placed thereon and printable areas, if necessary; and said base sheet of material and said second sheet of material being laminated together. Additionally, it is the object of this invention to teach a method of producing a label assembly having adhesive on the base sheet only, for use in applications that require the use of consumer products labeling and allows the use of impact and non impact printing equipment comprising the steps of providing a plurality of webs of sheet material; printing, as necessary, on one of said sheets of material; coating the back of said printed sheet of material with silicone; positioning an adhesive pattern on the other sheet of material; laminating the sheets; of material together; die cutting and stripping the matrix creating the tag; initial cutting of said sheets of material into strips; and, punching form feeding apertures into the edges of said sheet.

BRIEF DESCRIPTION OF THE INVENTION

Further objects and features of this invention will become more apparent by reference to the following description taken in conjunction with the following figures, in which:

FIG. 1 illustrates the front side of the label assembly of the present invention; and FIG. 2 is a block diagram showing the novel method of producing the label assembly.

DESCRIPTION OF THE PREFERRED EMBODIMENTS

Figure 1:
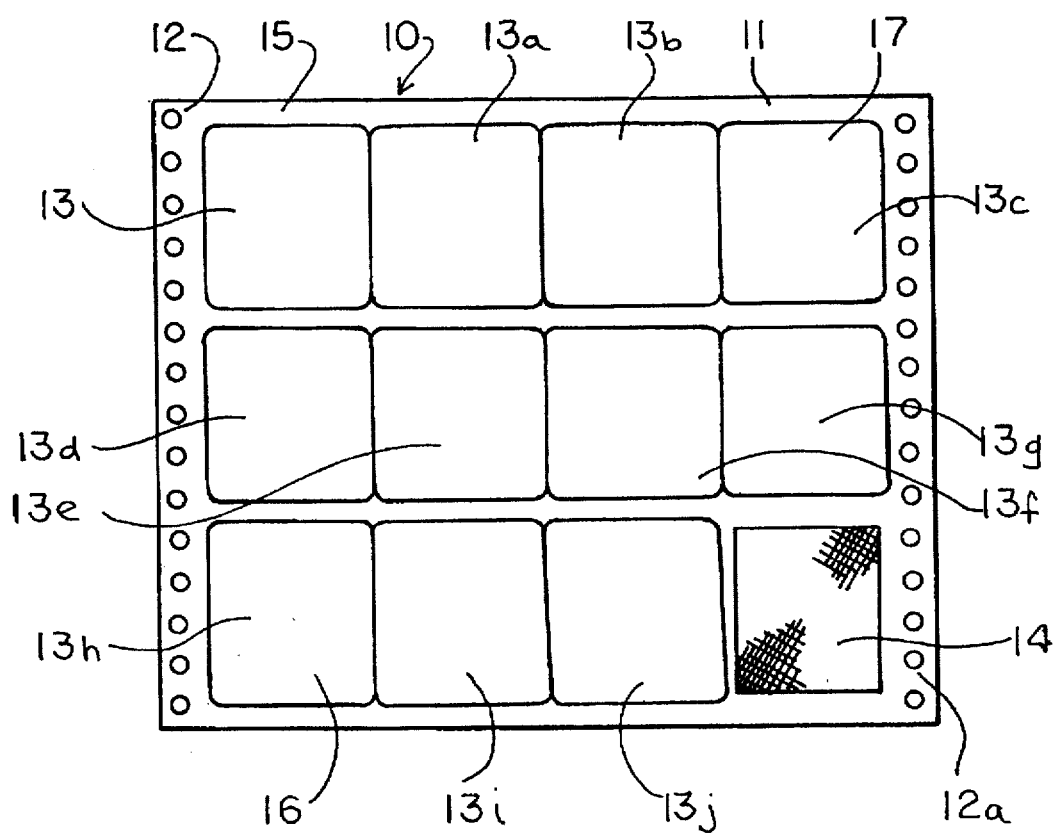
Figure 2:
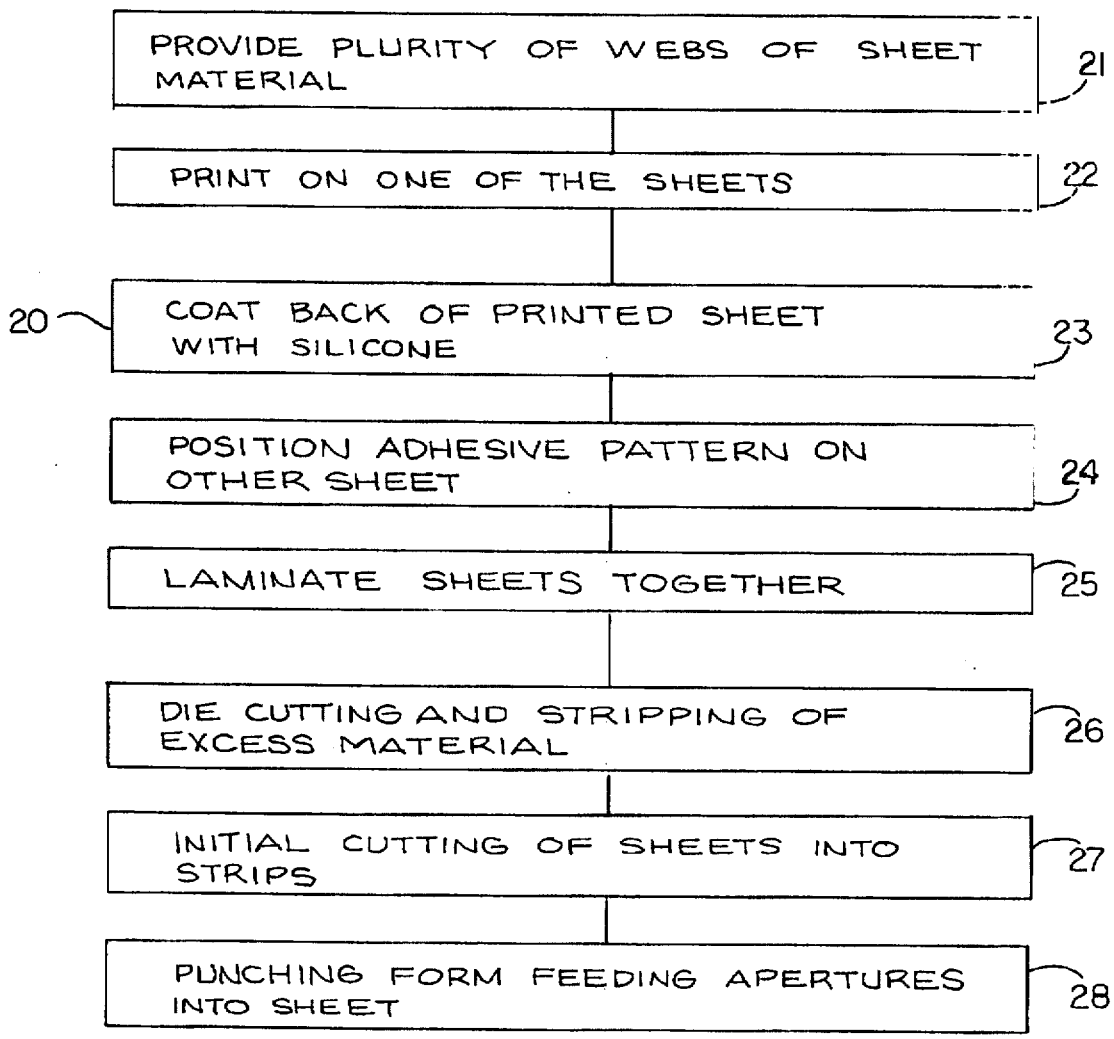

The present invention is a tag structure attachable to a product and having adhesive only on the base or carrier sheet of the label assembly only. This tag is designed to be used when a tag is needed for clothing or a fabric material and no adhesive is wanted on the product. As shown in the figures, the label assembly 10 is comprised of base or carrier sheet 11 which has a front side 15 and rear side (not shown). The base sheet 11 can be clay coated if desired. The base sheet 11 has apertures 12 and 12a punched into the edges of the base sheet 11 to allow for form feeding of the label assembly 10. Adhesive 14 (shown) is positioned in a pattern on the front side 15 of the base or carrier sheet 11. The adhesive is placed to be under the second sheet 16 in those positions that the finished tag 13 through 13j will be after the printing and cutting is accomplished. The second sheet 16 has a top side 17 and bottom side (not shown). A coating of silicone is adhered to the bottom side of the second sheet. Printing can be positioned on the top side 17 of the second sheet 16 or on the bottom side (not shown) if necessary and then the two sheets are pressed together. The initial die cutting is done creating the individual tags 13 through 13j. Other cutting methods can be used.

The method of producing the label assembly 20 comprises the steps of providing a plurality of webs of sheet material 21; printing, as necessary, on one of said sheets of material 22; coating the back of said printed sheet of material with silicone 23; positioning an adhesive pattern on the other sheet of material 24; laminating of the sheets together 25; die cutting and stripping the matrix creating the tags 26; initial cutting of said sheets of material into strips 27; and, punching the form feeding apertures into the edges of said sheet 28.

The use of this label assembly provides flexibility when dealing with consumer products, such as clothes and items made with fabric material, that the manufacturers wish to attach the tag by means of nylon attachment pieces or by means of stitched corners. Providing labels with no adhesive residue on them eliminates a potential problem for the clothing manufacturers and allows the label manufacturer the ability to use high speed printing equipment when producing the label assembly.

While I have described my invention in connection with specific embodiments thereof, it is clearly to be understood that this is done only by way of example and not as a limitation to the scope of our invention as set forth in the objects thereof and in the appended claims.

I claim:

1. A label assembly having adhesive on the base sheet only, for use in applications that are required for consumer product labeling and allow the use of impact and non impact printing equipment comprising:

a base sheet of material;

said base sheet of material having a front side and a rear side;

said front side of said base sheet of material having patches of adhesive coating positioned thereon for attaching purposes;

a second sheet of material;

said second sheet of material having a top side and a bottom side;

said top side of said second sheet of material having printable areas located thereon;

said bottom side of said second sheet of material having a silicone coating placed thereon and printable areas, if necessary;

said second sheet of material having a plurality of removable labels cut out therefrom; and said base sheet of material and said second sheet of material being laminated together.

2. A label assembly having adhesive on the base sheet only, according to claim 1, wherein:

said base sheet of material comprising units constructed of cellulose material;

said base sheet of material further comprising units constructed of plastic film;

said base sheet of material having a clay coating positioned thereon; and said base sheet of material further having a silicone layer positioned thereon.

3. A label assembly having adhesive on the base sheet only, according to claim 1, wherein:

said base sheet having a plurality of apertures located on each vertical side of said base sheet for facilitating passage through the printing equipment.

4. A label assembly having adhesive on the base sheet only, according to claim 1, wherein:

said second sheet of material comprising units constructed of cellulose construction; and said second sheet of material further comprising units constructed of plastic film.

* * * * *